United States Patent [19]
Kim

[11] Patent Number: 5,491,761
[45] Date of Patent: Feb. 13, 1996

[54] QUANTIZATION STEP SIZE ADJUSTING CIRCUIT USING EDGE DETECTIONS

[75] Inventor: Tae Euny Kim, Seoul, Rep. of Korea

[73] Assignee: SamSung Electronics Co., Ltd., Suwon, Rep. of Korea

[21] Appl. No.: 775,551

[22] Filed: Oct. 15, 1991

[30] Foreign Application Priority Data

Oct. 18, 1990 [KR] Rep. of Korea ............... 90-16635

[51] Int. Cl.$^6$ .................................................. G06K 9/38
[52] U.S. Cl. ......................... 382/251; 382/254; 348/405; 358/426
[58] Field of Search .................... 382/50, 51, 52, 382/53, 56, 22, 199, 242, 232, 244, 246, 251, 254, 248; 358/133, 136, 426, 430, 432, 433; 348/405

[56] References Cited

U.S. PATENT DOCUMENTS

| | | | |
|---|---|---|---|
| 4,677,479 | 6/1987 | Hatori et al. | 358/426 |
| 4,734,767 | 3/1988 | Kaneko et al. | 358/133 |
| 4,920,426 | 4/1990 | Hatori et al. | 358/133 |
| 5,051,840 | 9/1991 | Watanabe et al. | 358/426 |
| 5,113,256 | 5/1992 | Citta et al. | 358/133 |
| 5,121,216 | 6/1992 | Chen et al. | 358/432 |
| 5,126,857 | 6/1992 | Watanabe et al. | 358/433 |
| 5,150,433 | 9/1992 | Daly | 382/22 |
| 5,170,264 | 12/1992 | Saito et al. | 358/432 |
| 5,309,253 | 5/1994 | Ariga et al. | 382/47 |
| 5,345,517 | 9/1994 | Katayama et al. | 382/47 |

*Primary Examiner*—Yon J. Couso
*Attorney, Agent, or Firm*—Robert E. Bushnell

[57] ABSTRACT

A quantization step size adjusting circuit using edge detection techniques for adjusting quantization step sizes in sampling an image signal to provide a digital signal by controlling an image compression ratio in dependence upon a pixel density representation (levels of sophistication) of an image. The quantization step size adjusting circuit comprises a coordinate converter for providing the image signal representative of a luminance signal and color difference signals, an edge detector for detecting edge values representative of peripheral pixels of a plurality of addresses of the image signal designated by control signals, a block formatting circuit for formatting the image signal into a plurality of image blocks having a predetermined size of pixels, and a circuit for controlling quantization step sizes of the image signal in dependence upon a determination edge values representative of peripheral pixels of a plurality of addresses of the image signal designated by the control signals and a determination of a selected scale factor in accordance with the pixel density representation of the image.

31 Claims, 4 Drawing Sheets

| (X-1, Y-1) | (X, Y-1) | (X+1, Y-1) |
| --- | --- | --- |
| (X-1, Y) | (X, Y) | (X+1, Y) |
| (X-1, Y+1) | (X, Y+1) | (X+1, Y+1) |

QUANTIZATION STEP SIZE ADJUSTING CIRCUIT USING EDGE DETECTIONS

FIELD OF THE INVENTION

The present invention relates to a quanitzation step size adjusting circuit for use in an image compression method recommended by JPEG(the joint group of CCITT and ISO), and more particularly, to a quantization step size adjusting circuit in which an image is divided into a plurality of blocks and quantizing step size is varied in accordance with the image variations of the respective blocks to improve the S/N ratio.

BACKGROUND OF THE INVENTION

Generally, as shown in FIG. 1, the image compression method recommended by JPEG is carrried out after performing a discrete cosine transformation (DCT) conversion in order to carry out data compression within a digital image recording and reproducing device. Here, a quantizing step size is determined by a certain scaling factor S of a quantizing matrix which consists of 8×8 blocks, and in which the human optical characteristics are taken into account. Even if the quantizing step size is decided based on the certain scaling factor S, a sophisticated image can not be reproduced accurately and even a simple image requires a large amount of memories in its processing.

SUMMARY OF THE INVENTION

The present invention is intended to overcome the above described disadvantages of the prior art.

Therefore, it is an object of the present invention to provide a quantization step size adjusting circuit using edge detections, in which a picture is divided into a plurality of blocks in such a manner that a sophisticated image is accorded with a large scaling factor S so as to minimize the quantizing step size and to decrease a data compression ratio and a simple image is accorded with a small scaling factor S' so as to enlarge the quantizing step size and to increase the data compression ratio to improve the a signal-to-noise (S/N) ratio.

It is another object of the present invention to provide a quantization step size adjusting circuit using edge detections, in which the picture is divided into a plurality of blocks and the quantizing step size is varied corresponding to each block based on a level of sophistication of an image or the pixel density representation of the image in order to simplify the circuit.

In order to achieve the above described objects, the present invention resides in a quantization step size adjusting circuit using edge detections. The quantization step size adjusting circuit comprises a control part 10 for controlling the whole system, a coordinate converting part 20 for storing luminance signals and chrominance signals separately in response to input R(Red), B(Blue), and G(Green) video signals, and edge detecting part 30 for extracting contour data for one frame by detecting an edge value according to an address of the control art in response to the input luminance signals and the chrominance signals from the coordinate converting part, a frame memory 40 for storing the extracted contour data of the edge detecting part based on the address value of the control part, a block formatting part 50 for summing up the contour data for each block after dividing the contour data for one frame of the frame memory into a predetermined number of sub-blocks, and a scaling factor generating part 60 for generating scaling factors according to the sophistication of the image in response to the input summed-up edge value for each block from the block formatting part 50.

BRIEF DESCRIPTION OF THE DRAWINGS

The above objects and other advantages of the present invention will become more apparent by describing in detail the preferred embodiment of the present invention with reference to the attached drawings, in which.

DETAIL DESCRIPTION OF THE PREFERRED EMBODIMENT

Figure 1:
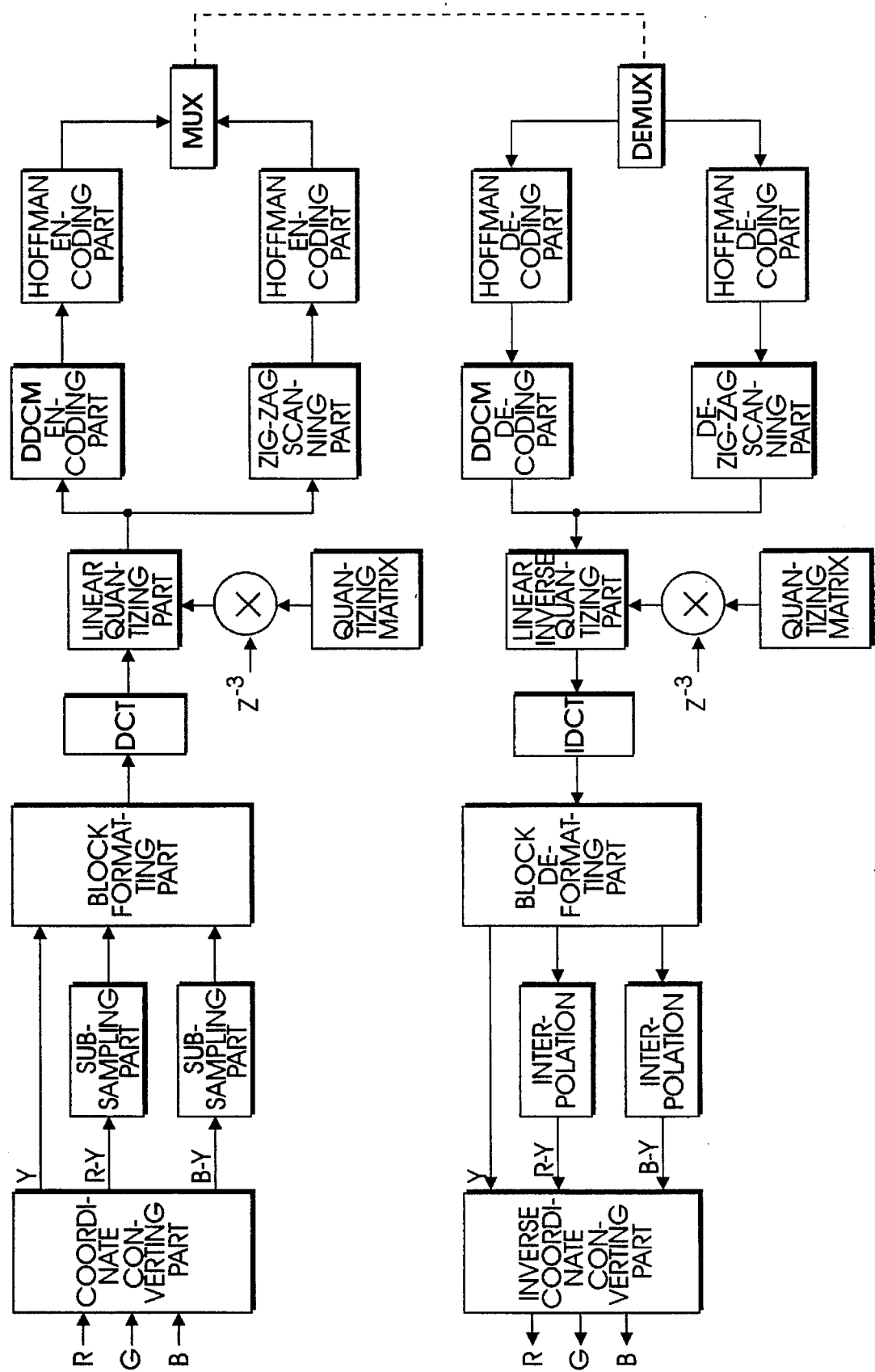
FIG. 1 is block diagram showing the algorithm recommended by JPEG.
Figure 2A:
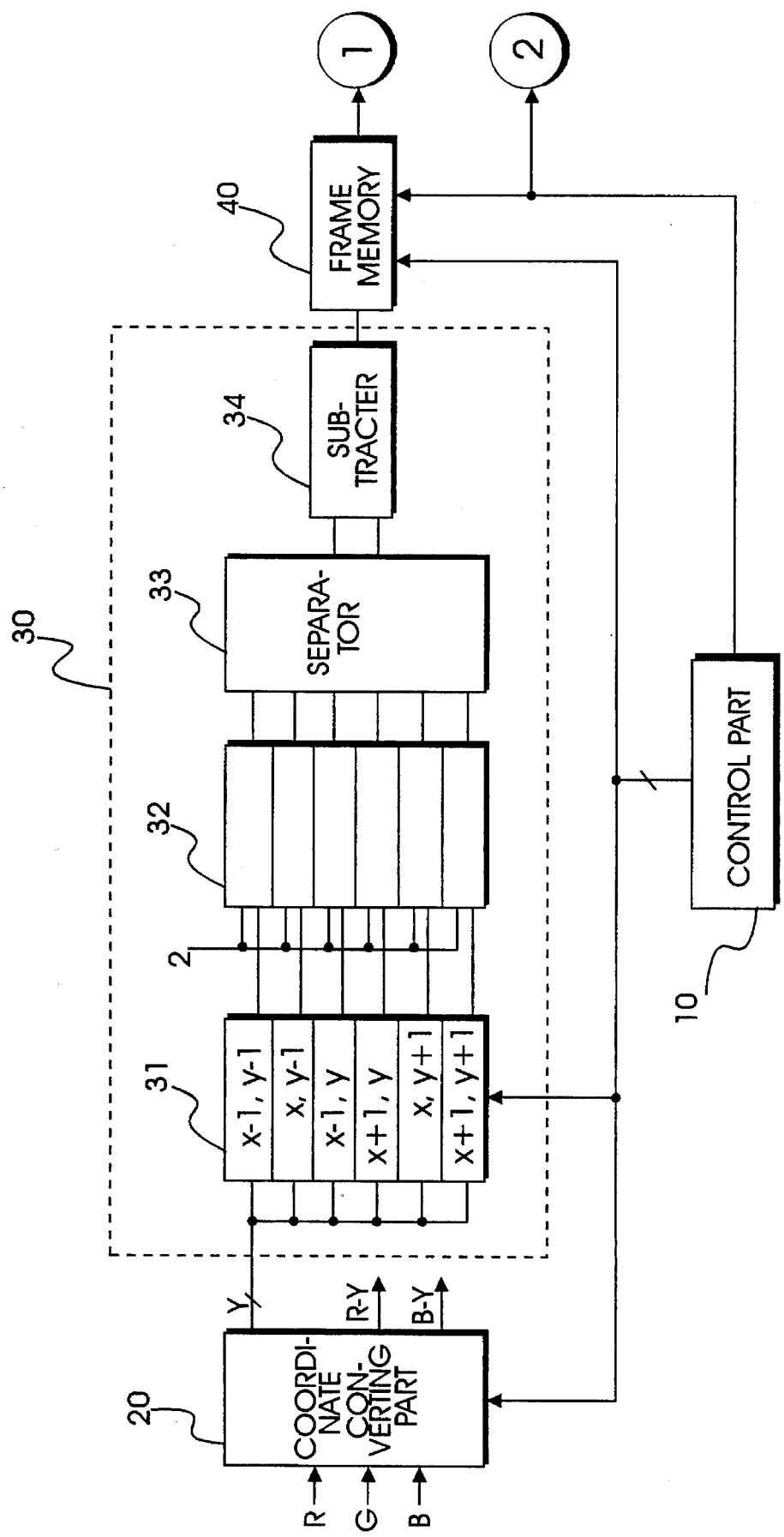
FIGS. 2A and 2B are block diagrams of the quantization step size adjusting circuit using edge detections according to the present invention.
Figure 2B:
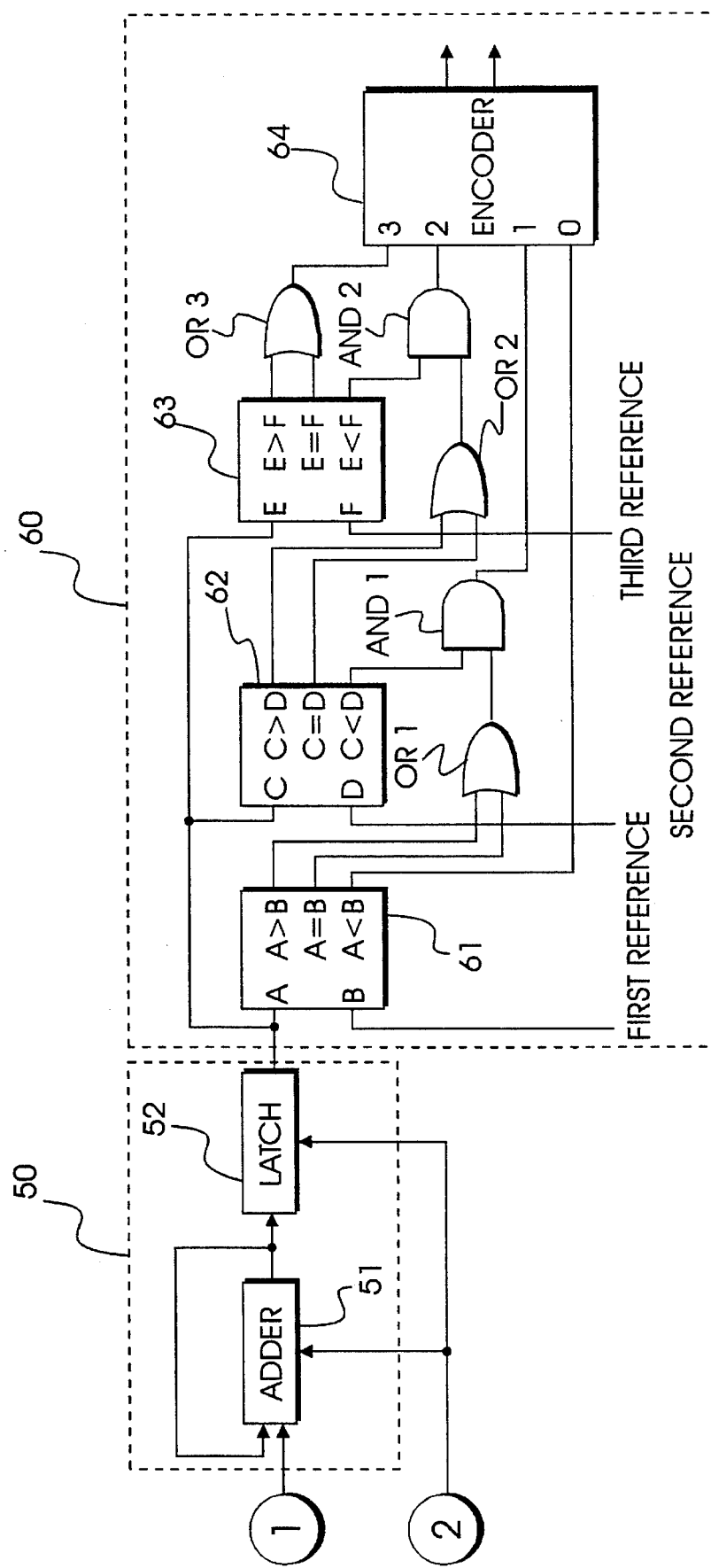

FIGS. 2A and 2B illustrate a block diagram of the quantization step size adjusting circuit using edge detections according to the present invention. As shown in FIGS. 2A and 2B, the quantization step size adjusting circuit comprises a control part 10 for controlling the system, a coordinate converting part 20 for separately storing luminance signals Y and chrominance signals C corresponding to input R,G,B video signals, an edge detecting part 30 for extracting contour data for one frame by detecting the edge values according to the address of the control part 10, in response to the input luminance signals Y and chrominance signals C from the coordinate converting section 20, a frame memory 40 for storing the contour data extracted from the edge detecting part 30 according to the address of the control part 10, a block formatting part 50 for outputting a summed-up output for each block after dividing the contour data for one frame of the frame memory 40 into a predetermined number of sub-blocks, and a scaling factor generating part 60 for generating scaling factors according to the block image status in response to the summed-up edge values for the respective blocks of the block formatting part 50.

The edge detecting part 30 includes a latching part 31 for latching the values of peripheral pixels where the edge values are detected according to the address of the control part 10, a multiplier 32 for multiplying the latched peripheral pixel values of the latching part 31 double, a separator 33 for summing up the double-multiplied pixel values of the multiplier 32 by separating them into a negative number portion and a positive number portion, and a subtracter 34 for detecting the edge values by summing up the positive number portion and the negative number portion of the separator 33.

The block formatting section 50 includes an adder 51 for summing up a predetermined number of edge value for the respective sub-blocks in response to the input edge value for one frame of the frame memory 40, and a latch 52 for carrying out a latching upon summing up the predetermined of edge values by the adder 51.

The scaling factor generating part 60 includes a first scaling factor generator for deciding the range of a first scaling factor by comparing the output signals of the latch 52 with a first reference value, a second scaling factor generator for deciding the range of a second scaling factor by logically combining the first scaling factor range-over signals of the first scaling factor generator after comparing the output signals of the latch 52 with a second reference value, a third scaling factor generator for deciding the range of a third scaling factor by logically combining the second scaling factor range-over signals of the second scaling factor generator after comparing the output signals of the latch 52 with a third reference value, a fourth scaling factor generator for deciding the range of a fourth scaling factor by logically combining the third scaling factor range-over signals of the third scaling factor generator, and an encoder 64 for encoding the scaling factor range deciding signals provided from the first to fourth scaling factor generator.

The circuit of the present invention as above will now be described as to its operation and effects.

First, the coordinate converting part 20 converts the input of R,G,B video signals into luminance signals Y and chrominance signals C, and stores into the frame memory. The present invention can be carried out using the luminance signals Y or the color signals C which are separately stored in the frame memory of the coordinate converting part 20, and the method using the chrominance signals C is similar to the conventional one and therefore, only the method using the luminance signals Y will be described below.

Figures 3A, 3B:
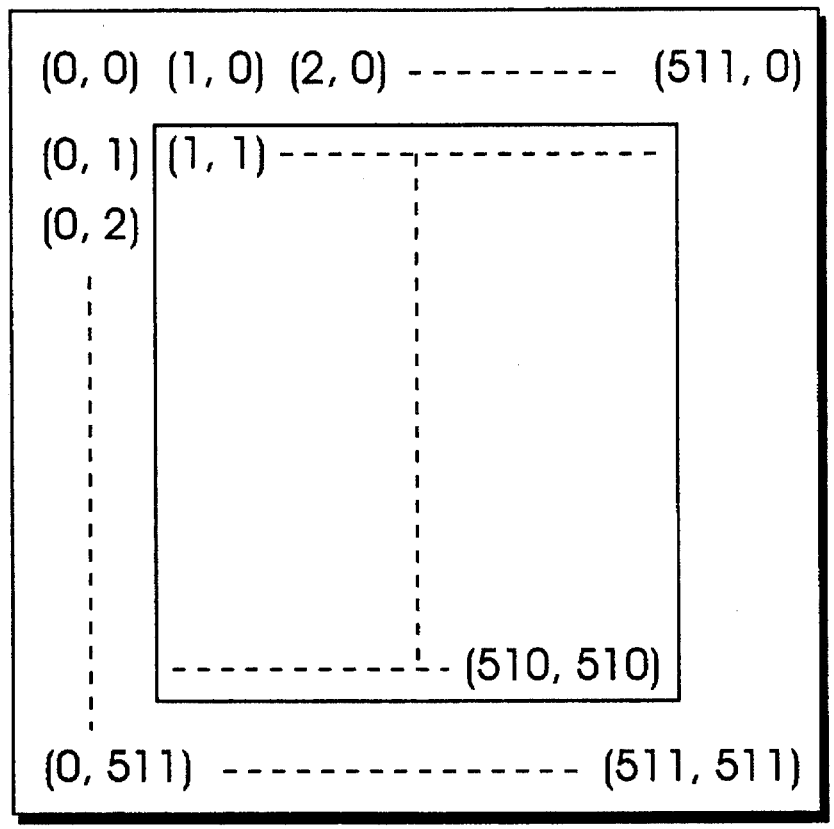
FIG. 3A is a view illustrating the frame memory of the coordinate converting part of FIG. 2.
FIG. 3B is a table showing the address coordinate values of the coordinate converting part.

The frame memory of the coordinate converting part 20 shown in FIG. 3A generates addresses X,Y from (1,1) to (510,510) except for the peripheral portions, where the peripheral addresses (X−1,Y−1) (X,Y−1) (X−1,Y) (X+1,Y) (X,Y+1) (X+1,Y+1) are generated for the respective addresses X,Y to read data, as shown in FIG. 3B.

The data read by the coordinate converting part 20 is applied to the latch 31 to be latched by clock signals of the control part 10. The latched output of the latch 31 is applied to the multiplier 32 from which the data is doubled. The output signals of the multiplier 32 are supplied to the separator 33 and separated into a negative number portion and positive number portion to be summed up together.

The summed-up output of the separator 33 is applied to the subtracter 24 in which the positive number portion and the negative number portion are subtracted in order to detect the edge values. Under this condition, maskings in the directions of the X and Y axes are used in order to detect the edge values and the following table 1 shows examples of the summations of the maskings in the directions of X and Y axes.

TABLE 1

| −1 | −2 | −1 | −1 | 0 | 1 | −2 | −2 | 0 |
|---|---|---|---|---|---|---|---|---|
| 0 | 0 | 0 | −2 | 0 | 2 | −2 | 0 | 2 |
| 1 | 2 | 1 | −1 | 0 | 1 | 0 | 2 | 2 |

Therefore, the edge values of the addresses X,Y are as shown in table 2 below;

$2\{(X+1,Y)+(X,Y+1)+(X+1,Y+1)\}-2\{(X-1,Y-1)+(X,Y-1)+(X-1,Y)\}$

TABLE 2

| (X−1,Y−1) | (X,Y−1) | (X+1,Y+1) | 2 | −2 | 0 |
|---|---|---|---|---|---|
| (X−1,Y) | (X,Y) | (X+1,Y) | −2 | 0 | 2 |
| (X−1,Y+1) | (X,Y+1) | (X+1,Y+1) | 0 | 2 | 2 |

When the addresses X,Y excluding the peripheral portions are increased from (1,1) to (510,510) according to the control signals of the control part 10 and the edge values for the respective addresses X,Y, which are detected by the subtracter 34 are stored into the frame memory 40. The edge values which are stored in the frame memory 40 are divided into 8×8 block units according to the control signals of the control part 10, and 64 addresses are generated for each block. Therefore, when 64 edge values are summed up by the adder 51, they are cleared and the next block is latched by the latch 52.

The latched output of the latch 52 is applied to an input terminal A of a first comparator 61, and the values of the latched output are compared with a first reference value which is input through an input terminal B of the comparator G1. If the latched output value of the latch 52 is smaller than the first reference value, a first scaling factor is determined and is input into a first input terminal of the encoder 64.

On the other hand, if the latched output of the latch 52 is equal to or larger than the first reference value, the output value of the latch 52 is input into an input terminal C of a second comparator 62, and compared with a second reference value which is input through an input terminal D of the second comparator G2.

If the latched output of the latch 52 is smaller than the second reference value, the output value of the first comparator 61 is input through an OR gate OR1 to an AND gate AND 1 and is logically combined with the output value of the second comparator 62. If the combined value is decided as a second scaling factor, then it is supplied to an input terminal 1 of the encoder 64.

On the other hand, if the latched output of the latch 52 is equal to or larger than the second reference value, the output of the latch 52 is input into an input terminal E of a third comparator 63 and compared with a third reference value. If it is smaller than the third reference value, the output value of the second comparator 62 is input through an OR gate OR2 to an AND gate AND2, and is logically combined together with the data to be decided as a third scaling factor to supply to an input terminal 2 of the encoder 64.

On the other hand, if the output of the latch 52 is equal to or larger than the third reference value, the output of the third comparator 63 is input into an OR gate OR3 to be logically combined and decided as a fourth scaling factor for supplying to an input terminal 3 of the encoder 64.

Accordingly, the encoder 64 encodes the scaling factors which are output in accordance with the sophistication of an image.

As described above, the quantization step size adjusting circuit using edge detections according to the present invention includes a control part for controlling the system, a coordinate converting part for separately storing luminance signals and chrominance signals in response to the input R,G,B video signals, an edge detecting part for extracting contour data for one frame by detecting the edge values in according to the address of the control part in response to the input luminance signals and chrominance signals of the coordinate converting part, a frame memory for storing the contour data of the edge detecting part according to the address values of the control part, a block formatting part for summing up the edge values for each block after dividing the contour data for one frame of the frame memory into a predetermined number of sub-blocks, and a scaling factor generating part for generating scaling factors according to the level of sophistication of the block images in response to the input summed-up edge values for each block from the block image formatting part.

Thus, in case of the block having sophisticated image signals, the quantizing step size is reduced so as to reduce the data compression ratio and in case of the block is representative of a simple image, the quantizing step size is enlarged so as to increase the data compression ratio for improving the S/N ratio.

What is claimed is:

1. A quantization step size adjusting circuit using edge detections, comprising:

control means for providing control signals to control and entire system;

coordinate converting means for providing a luminance signal and color difference signals in dependence upon reception of an image signal representative of a red color, a green color and a blue color;

edge detecting means for extracting contour data for each frame of said luminance and color difference signals by detecting edge values corresponding to addresses designated by said control signals in dependence upon reception of said luminance and color difference signals;

frame memory means for storing the extracted contour data according to the addresses designated by said control signals;

block formatting means for summing up edge values in each data block of said luminance and color difference signals after dividing the stored contour data for one frame into a plurality of data blocks; and scaling factor generating means for generating a plurality of scaling factors in accordance with pixel density representation of an image in response to the summed-up edge values for each data block from said block formatting means.

2. The quantization step size adjusting circuit as claimed in claim 1, wherein said scaling factor generating means comprises:

first scaling factor generating means for deciding a range of a first scaling factor by comparing output signals of said block formatting means with a first reference value;

second scaling factor generating means for deciding a range of a second scaling factor by logically combining the range of the first scaling factor of said first scaling factor generating means after comparing the output signals of said block formatting means with a second reference value;

third scaling factor generating means for deciding a range of a third scaling factor by logically combining the range of the second scaling factor of said second scaling factor generating means after comparing the output signals of said block formatting means with a third reference value;

fourth scaling factor generating means for deciding a range of a fourth scaling factor by logically combining the range of the third scaling factor of said third scaling factor generating means; and means for encoding the scaling factor range deciding signals of said first, second, third and fourth scaling factor generating means according to said pixel density of each data block.

3. A circuit for adjusting quantization step sizes in sampling of an image signal to provide a digital signal, said circuit comprising:

means for receiving said image signal on a frame-by-frame basis with each frame of said image signal comprised of a plurality of image blocks;

means for determining a quantized step adjusting signal representative of a quantized step size for quantization of said image signal in dependence upon a determination of edge values representative of peripheral pixels of respective ones of a plurality of addresses in each frame of said image signal designated by control signals and a determination of a selected scale factor signal in accordance with pixel density representation of each image block comprised of a predetermined size of pixels in each frame, said quantized step adjusting signal determining means comprising:

edge detector means for detecting said edge values representative of peripheral pixels of respective ones of said plurality of addresses in each frame of said image signal designated by said control signals;

frame memory means for storing detected edge values for each frame of said image signal;

block format means for accumulating stored edge values from said frame memory means for each image block in each frame of said image signal in accordance with said control signals to provide an accumulated edge value signal;

scaling factor means for determining scaling factor values for said accumulated edge value signal in accordance with said pixel density representation of each image block to provide said selected scaling factor signal; and means for providing said quantized step adjusting signal in dependence upon said selected scaling factor signal;

means for quantizing each image block in each frame of said image signal in accordance with said quantized step adjusting signal to provide a quantized signal; and means for encoding said quantized signal to provide said digital signal.

4. The circuit for adjusting quantization step sizes as claimed in claim 3, wherein said block format means comprises:

adder means for adding said edge values for each image block in each frame of said image signal in accordance with said control signals to provide an added edge value signal; and latch means for latching said added edge value signal in accordance with said control signals to provide said accumulated edge value signal.

5. The circuit for adjusting quantization step sizes as claimed in claim 3, wherein said scaling factor means comprises:

comparing means for comparing said accumulated edge value signal with a plurality of reference values to provide a plurality of scaling factor values; and encoder means for encoding between said plurality of scaling factor values to provide said selected scaling factor signal for determining said quantized step adjusting signal.

6. The circuit for adjusting quantization step sizes as claimed in claim 3, wherein said scaling factor means comprises:

first comparing means for comparing said accumulated edge value signal with a first reference value in dependence upon said control signals to provide a first compared signal when said accumulated edge value signal has a discrete value greater than said first reference value, a second compared signal when said discrete value of said accumulated edge value signal is equal to said first reference value, and a third compared signal representative of a first scaling factor when said discrete value of said accumulated edge value signal is less than said first reference value;

first logic means for logically combining said first and second compared signals to provide a first logic signal;

second comparing means for comparing said accumulated edge value signal with a second reference value to provide a fourth compared signal when a discrete value of said accumulated edge value signal is greater than said second reference value, a fifth compared signal when said discrete value of said accumulated edge value signal is equal to said second reference value, and a sixth compared signal when said discrete value of said accumulated edge value signal is less than said second reference value;

second logic means for logically combining said fourth and fifth compared signals to provide a second logic signal;

third logic means for logically combining said first logic signal and said sixth compared signal to provide a second scaling factor;

third comparing means for comparing said accumulated edge value signal with a third reference value to provide a seventh compared signal when said accumulated edge value signal has a discrete value greater than said third reference value, an eighth compared signal when said discrete value of said accumulated edge value signal is equal to said third reference value, and a ninth compared signal when said discrete value of said accumulated edge value signal is less than said third reference value;

fourth logic means for logically combining said second logic signal and said ninth compared signal to provide a third scaling factor;

fifth logic means for logically combining said seventh and eighth compared signals to provide a fourth scaling factor; and encoder means for encoding said third compared signal representative of said first scaling factor, said second scaling factor, said third scaling factor, and said fourth scaling factor in accordance with said pixel density representation of each image block in each frame of said image signal to provide said selected scaling factor signal.

7. The circuit for adjusting quantization step sizes as claimed in claim 3, wherein said predetermined number of pixels of each image block of said plurality of image blocks is 8×8.

8. The circuit for adjusting quantization step sizes as claimed in claim 3, wherein said edge detector means comprises:

latch means for latching said image signal representative of said peripheral pixels of respective ones of said plurality of addresses in each frame of said image signal in accordance with said control signals to provide a plurality of latched pixel values;

multiplier means for multiplying said plurality of latched pixel values with a constant value to provide a plurality of multiple pixel values;

means for adding and separating said plurality of multiple pixel values to provide a negative value and a positive value; and subtractor means for detecting said edge values representative of said peripheral pixels of respective ones of said plurality of addresses in each frame of said image signal by subtracting said negative value and said positive value.

9. A circuit for adjusting quantization step sizes of an image signal, comprising:

means coupled to receive said image signal representative of a picture frame, for dividing said image signal into a plurality of image blocks each comprised of a predetermined number of pixels;

edge detector means for detecting edge values representative of peripheral pixels of respective ones of a plurality of addresses of said image signal designated by control signals;

frame memory means for storing detected edge values for each picture frame;

block format means for accumulating stored edge values from said picture frame for each image block of said plurality of image blocks in accordance with said control signals to provide an accumulated edge value signal;

scaling factor means for determining scaling factor values for said accumulated edge value signal in accordance with pixel density representation of each image block of said image signal to provide a selected scaling factor signal;

means for providing said quantized step adjusting signal in dependence upon said selected scaling factor signal;

means for quantizing each image block of said image signal in accordance with said quantized step adjusting signal to provide a quantized signal; and means for encoding said quantized signal to provide a digital signal.

10. The circuit for adjusting quantization step sizes as claimed in claim 9, wherein said edge detector means comprises:

latch means for latching said image signal representative of said peripheral pixels of respective ones of said plurality of addresses in each picture frame in accordance with said control signals to provide a plurality of latched pixel values;

multiplier means for multiplying said plurality of latched pixel values with a constant value to provide a plurality of multiple pixel values;

means for adding and separating said plurality of multiple pixel values to provide a negative value and a positive value; and subtractor means for detecting said edge values representative of said peripheral pixels of respective ones of said plurality of addresses in each picture frame of said image signal by subtracting said negative value and said positive value.

11. The circuit for adjusting quantization step sizes as claimed in claim 10, wherein said block format means comprises:

adder means for adding said edge values for each image block in each picture frame in accordance with said control signals to provide an added edge value signal; and latch means for latching said added edge value signal in accordance with said control signals to provide said accumulated edge value signal.

12. The circuit for adjusting quantization step sizes as claimed in claim 11, wherein said scaling factor means comprises:

comparing means for comparing said accumulated edge value signal with a plurality of reference values to provide a plurality of scaling factor values; and encoder means for encoding between said plurality of scaling factor values to provide said selected scaling factor signal.

13. The circuit for adjusting quantization step sizes as claimed in claim 11, wherein said scaling factor means comprises:

first comparing means for comparing said accumulated edge value signal with a first reference value in dependence upon said control signals to provide a first compared signal when said accumulated edge value signal has a discrete value greater than said first reference value, a second compared signal when said accumulated edge value signal has said discrete value equal to said first reference value, and a third compared signal representative of a first scaling factor when said accumulated edge value signal has said discrete value less than said first reference value;

first logic means for logically combining said first and second compared signals to provide a first logic signal;

second comparing means for comparing said accumulated edge value signal with a second reference value to provide a fourth compared signal when said accumulated edge value signal has a discrete value greater than said second reference value, a fifth compared signal when said accumulated edge value signal has said discrete value equal to said second reference value, and a sixth compared signal when said accumulated edge value signal has said discrete value less than said second reference value;

second logic means for logically combining said fourth and fifth compared signals to provide a second logic signal;

third logic means for logically combining said first logic signal and said sixth compared signal to provide a second scaling factor;

third comparing means for comparing said accumulated edge value signal with a third reference value to provide a seventh compared signal when said accumulated edge value signal has a discrete value greater than said third reference value, an eighth compared signal when said accumulated edge value signal has said discrete value equal to said third reference value, and a ninth compared signal when said accumulated edge value signal has said discrete value less than said third reference value;

fourth logic means for logically combining said second logic signal and said ninth compared signal to provide a third scaling factor;

fifth logic means for logically combining said seventh and eighth compared signals to provide a fourth scaling factor; and encoder means for encoding said third compared signal representative of said first scaling factor, said second scaling factor, said third scaling factor, and said fourth scaling factor in accordance with the pixel density representation of each image block of said image signal to provide said selected scaling factor signal.

14. The circuit for adjusting quantization step sizes as claimed in claim 9, wherein said predetermined number of pixels of each image block of said plurality of image blocks is 8×8.

15. A device for adjusting quantization step sizes, comprising:

means for receiving an image signal;

edge detector means for extracting contour data for each frame of said image signal upon detection of edge values of corresponding addresses in each frame of said image signal;

frame memory means for storing the contour data on a frame-by-frame basis;

block format means for dividing the contour data for each frame of said image signal from said frame memory means into a plurality of data blocks having a predetermined size of pixels, and for generating an accumulated edge value signal by accumulating edge values of each data block of said image signal; and scaling factor generator means for generating a selected one of a plurality of scaling factors in accordance with pixel density representation of each data block in response to the accumulated edge value signal, said scaling factor generator means comprising:

comparator means for generating said plurality of scaling factors in dependence upon a comparison of said accumulated edge value signal with a plurality of reference values; and means for generating said selected one of said plurality of scaling factors by encoding said plurality of scaling factors in dependence upon said pixel density representation of each data block of said image signal.

16. The device for adjusting quantization step sizes as claimed in claim 15, wherein said predetermined size of pixels of each data block of said plurality of data blocks is 8×8.

17. The device for adjusting quantization step sizes as claimed in claim 15, wherein said edge detector means comprises:

latch means for generating a plurality of latched pixel values by latching peripheral pixels of corresponding ones of said addresses in each frame of said image signal in accordance with control signals;

multiplier means for generating a plurality of multiple pixel values by multiplying said plurality of latched pixel values with a constant value;

means for generating a negative value and a positive value by adding and separating said plurality of multiple pixel values; and subtractor means for detecting said edge values representative of said peripheral pixels of corresponding ones of said addresses in each frame of said image signal by subtracting said negative value and said positive value.

18. The device for adjusting quantization step sizes as claimed in claim 15, wherein said block format means comprises:

adder means for generating an added edge value signal by adding said edge values for each data block in accordance with control signals; and latch means for generating said accumulated edge value signal by latching said added edge value signal in accordance with said control signals.

19. An image compression method, comprising the steps of:

receiving an image signal on a frame-by-frame basis;

providing a plurality of pixel values representative of peripheral pixels of corresponding ones of a plurality of addresses in each frame;

providing a plurality of multiple pixel values by multiplying said plurality of pixel values with a constant value;

separating a negative value portion and a positive value portion from said plurality of multiple pixel values; and extracting contour data for each frame of said image signal upon detection of edge values of corresponding ones of said plurality of addresses in each frame of said image signal by combining said negative value portion and said positive value portion;

temporarily storing the contour data on said frame-by-frame basis onto a memory;

dividing the contour data for each frame of said image signal from said memory into a plurality of data blocks having a predetermined size of pixels;

generating an accumulated edge value signal by accumulating edge values of each data block of said image signal;

generating a plurality of scaling factors in dependence upon a comparison of said accumulated edge value signal with a plurality of reference values; and generating a selected one of said plurality of scaling factors by encoding said plurality of scaling factors in dependence upon pixel density of each data block of said image signal.

20. The image compression method as claimed in claim 19, wherein said predetermined size of pixels of each data block of said plurality of data blocks is 8×8.

21. The image compression method as claimed in claim 19, wherein said plurality of scaling factors are generated by:

comparing said accumulated edge value signal with a first reference value to provide a first compared signal when said accumulated edge value signal has a discrete value greater than said first reference value, a second compared signal when said discrete value of said accumulated edge value signal is equal to said first reference value, and a third compared signal representative of a first scaling factor of said plurality of scaling factors when said discrete value of said accumulated edge value signal is less than said first reference value;

logically combining said first and second compared signals to provide a first logic signal;

comparing said accumulated edge value signal with a second reference value to provide a fourth compared signal when a discrete value of said accumulated edge value signal is greater than said second reference value, a fifth compared signal when said discrete value of said accumulated edge value signal is equal to said second reference value, and a sixth compared signal when said discrete value of said accumulated edge value signal is less than said second reference value;

logically combining said fourth and fifth compared signals to provide a second logic signal, and logically combining said first logic signal and said sixth compared signal to provide a second scaling factor of said plurality of scaling factor;

comparing said accumulated edge value signal with a third reference value to provide a seventh compared signal when said accumulated edge value signal has a discrete value greater than said third reference value, an eighth compared signal when said discrete value of said accumulated edge value signal is equal to said third reference value, and a ninth compared signal when said discrete value of said accumulated edge value signal is less than said third reference value;

logically combining said second logic signal and said ninth compared signal to provide a third scaling factor of said plurality of scaling factors, and logically combining said seventh and eighth compared signals to provide a fourth scaling factor of said plurality of scaling factors.

22. An image compression device, comprising:

means for receiving an image signal representative of an image;

means for detecting edge values representative of peripheral pixels of corresponding ones of a plurality of addresses of said image signal and for formatting said image signal from each data frame into a plurality of data blocks each comprised of a predetermined number of pixels, said edge values detecting and data formatting means comprising:

means for generating a plurality of latched pixel values by latching said image signal defined by a plurality of addresses respectively representative of peripheral pixels in accordance with control signals;

means for generating a plurality of multiple pixel values by multiplying said plurality of latched pixel values with a constant value;

means for generating a negative discrete value and a positive discrete value by adding and separating said plurality of multiple pixel values;

means detecting said edge values representative of said peripheral pixels corresponding to said plurality of addresses of said image by subtracting said negative discrete value from said positive discrete value;

memory means for storing the detected edge values for each data frame; and means for accumulating said detected edge values of each data block of said data frame and dividing said image signal from each data frame into said plurality of data block;

means for generating a plurality of scaling factors respectively representative of the state of density distribution of each data block of said data frame;

means for generating a quantizing step size value corresponding to each scaling factor for each data block of said data frame; and means for quantizing said image signal in accordance with said quantizing step size value.

23. The image compression device as claimed in claim 22, wherein said predetermined number of pixels of each data block of said plurality of data blocks is 8×8.

24. The quantization step size circuit as claimed in claim 1, wherein said block formatting means comprises:

adder means for adding said edge values for each data block in accordance with said control signals to provide said summed-up edge values for each data block; and latch means for latching said summed-up edge values for each data block in accordance with said control signals to said scaling factor generating means.

25. The quantization step size circuit as claimed in claim 1, wherein said scaling factor generating means comprises:

comparing means for comparing said summed-up edge values with a plurality of reference values to provide a plurality of scaling factor values; and encoder means for encoding between said plurality of scaling factor values in accordance with said pixel density representation of each data block.

26. The quantization step size circuit as claimed in claim 1, wherein said sealing factor generating means comprises:

first comparing means for comparing said summed-up edge values with a first reference value to provide first, second and third compared signals, said third compared signal representative of a first scaling factor;

first logic means for logically combining said first and second compared signals to provide a first logic signal;

second comparing means for comparing said summed-up edge values with a second reference value to provide fourth, fifth and sixth compared signals;

second logic means for logically combining said fourth and fifth compared signals to provide a second logic signal;

third logic means for logically combining said first logic signal and said sixth compared signal to provide a second scaling factor;

third comparing means for comparing said summed-up edge values with a third reference value to provide seventh, eighth and ninth compared signals;

fourth logic means for logically combining said second logic signal and said ninth compared signal to provide a third scaling factor;

fifth logic means for logically combining said seventh and eighth compared signals to provide a fourth scaling factor; and encoder means for encoding said third compared signal representative of said first scaling factor, said second scaling factor, said third scaling factor, and said fourth scaling factor to provide a selected scaling factor signal for quantization of each data block in accordance with said pixel density representation of each data block.

27. The quantization step size circuit as claimed in claim 1, wherein said edge detecting comprises:

latch means for latching said image signal representative of said peripheral pixels of corresponding ones of said addresses in each frame in accordance with said control signals to provide a plurality of latched pixel values;

multiplier means for multiplying said plurality of latched pixel values with a constant value to provide a plurality of multiple pixel values;

means for adding and separating said plurality of multiple pixel values to provide a negative value and a positive value; and subtractor means for detecting said edge values representative of said peripheral pixels of corresponding ones of said addresses in each frame of said image by subtracting said negative value from said positive value.

28. A quantization step size circuit, comprising:

means for receiving image data on a frame-by-frame basis;

edge detector means for successively detecting edge values representative of peripheral pixels of respective addresses of said image data in each frame;

frame memory means for storing detected edge values for each frame of said image data comprised of a plurality of sub-blocks;

means for accumulating stored edge values for each sub-block of said each frame successively to provide an accumulated edge value for each sub-block of said image data;

scaling factor means for responding to said accumulated edge value for each sub-block of said image data to generate a selected scaling factor based upon pixel density representation of each sub-block of said image data, said scaling factor means comprising:

first comparing means for making a first comparison between said accumulated edge value for each sub-block of said image data in each frame with a first reference value, and for generating one of a first scaling factor, a first compared signal, and a second compared signal in dependence upon said first comparison;

first logic means for responding to said first and second compared signals and generating a first logic signal;

second comparing means for making a second comparison between said accumulated edge value for each sub-block of said image data in each frame with a second reference value, and for generating one of third, fourth, and fifth compared signals in dependence upon said second comparison;

second logic means for logically responding to said third and fourth compared signals and generating a second logic signal;

third logic means for locally responding to said first logic signal and said fifth compared signal and generating a second scaling factor;

third comparing means for making a third comparison between said accumulated edge value for each sub-block of said image data in each frame with a third reference value, and for generating one of sixth, seventh, and eighth compared signals in dependence upon said third comparison;

fourth logic means for logically responding to said second logic signal and said eighth compared signal and generating a third scaling factor;

fifth logic means for logically responding to said sixth and seventh compared signals and generating a fourth scaling factor; and encoder means for encoding said first, second, third, and fourth scaling factors to produce said selected scaling factor signal for quantization of each sub-block of said image data; and means for quantizing each sub-block of said image data in said each frame based upon said selected scaling factor, and for encoding quantized image data to generate digital image data.

29. The quantization step size circuit as claimed in claim 28, further comprised of:

said first comparing means generating said first scaling factor when said accumulated edge value is less than said first reference value, said first compared signal when said accumulated edge value is greater than said first reference value, and said second compared signal when said accumulated edge value is equal to said first reference value;

said second comparing means generating said third compared signal when said accumulated edge value is greater than said second reference value, said fourth compared signal when said accumulated edge value is equal to said second reference value, and said fifth compared signal when said accumulated edge value is less than said second reference value; and said third comparing means generating said sixth compared signal when said accumulated edge value is greater than said third reference value, said seventh compared signal when said accumulated edge value is equal to said third reference value, and said eighth compared signal when said accumulated edge value is less than said third reference value.

30. The quantization step size circuit as claimed in claim 28, wherein said means for accumulating stored edge values for each sub-block of said each frame comprises:

adder means for adding said stored edge values for each sub-block of said each frame successively to produce an added edge value for each sub-block of said imagine data; and latch means for generating said accumulated edge value for each sub-block of said image data by accumulating and latching said added edge value.

31. The quantization step size circuit as claimed in claim 28, wherein said edge detector means comprises:
  latch means for latching pixel values of said peripheral pixels of respective addresses of said image data in each frame to provide a plurality of latched pixel values;
  multiplier means for multiplying said plurality of latched pixel values with a constant value to provide a plurality of multiple pixel values;
  means for combining said plurality of multiple pixel values to provide a negative value and a positive value; and
  subtractor means for detecting said edge values representative of said peripheral pixels of respective addresses in each frame of said image data by subtracting said negative value from said positive value.

* * * * *